United States Patent
Tran

Patent Number: 5,508,928
Date of Patent: Apr. 16, 1996

[54] AIRCRAFT SURVIVABILITY SYSTEM STATE MANAGEMENT

[75] Inventor: My Tran, Albuquerque, N.M.

[73] Assignee: Honeywell, Inc., Minneapolis, Minn.

[21] Appl. No.: 977,325

[22] Filed: Nov. 17, 1992

[51] Int. Cl.$^6$ .................. G01S 7/36; H04K 3/00; G06F 7/70

[52] U.S. Cl. .............. 364/423; 364/424.01; 342/13; 342/16; 434/2

[58] Field of Search ............ 364/423, 424.01, 364/424.06; 342/13, 14, 16, 20, 169; 434/2; 340/973, 945

[56] References Cited

U.S. PATENT DOCUMENTS

| | | | |
|---|---|---|---|
| 4,424,038 | 1/1984 | Tingleff et al. | 434/2 |
| 4,647,759 | 3/1987 | Worsham et al. | 235/411 |
| 4,658,359 | 4/1987 | Palatucci et al. | 364/424.06 |
| 4,845,495 | 7/1989 | Bollard et al. | 364/424.06 |
| 4,866,450 | 9/1989 | Chisholm | 342/410 |
| 4,959,015 | 9/1990 | Rasinski et al. | 434/2 |
| 5,111,400 | 5/1992 | Yoder | 364/424.01 |
| 5,122,801 | 6/1992 | Hughes | 342/13 |
| 5,155,491 | 10/1992 | Ando | 342/357 |
| 5,228,854 | 7/1993 | Eldridge | 434/14 |
| 5,257,190 | 10/1993 | Crane | 364/424.01 |
| 5,287,110 | 2/1994 | Tran | 342/13 |
| 5,367,524 | 11/1994 | Rideout, Jr. et al. | 370/104.1 |
| 5,378,155 | 1/1995 | Eldridge | 434/14 |
| 5,406,286 | 4/1995 | Tran et al. | 342/13 |

*Primary Examiner*—Kevin J. Teska
*Assistant Examiner*—Tyrone V. Walker
*Attorney, Agent, or Firm*—Kenneth J. Johnson; Ronald E. Champion

[57] ABSTRACT

Aircraft survivability system state management is based on system mode, time, altitude, aircraft position, reference radius, and manual aircraft survivability equipment configuration select. The system mode is used with a segment number to begin system configuration sequencing of a segment pointer. A mission aircraft survivability system configuration plan comprises a number of segments of a mission plan. Each segment contains information such as the time, altitude and position for each segment. The segment is displayed in an active configuration and a next configuration on an aircraft survivability equipment display. When the aircraft enters a detection window the segment pointer is updated by an aircraft survivability system mode control processor. The system may be placed in either automatic mode or manual mode.

2 Claims, 7 Drawing Sheets

AIRCRAFT SURVIVABILITY SYSTEM STATE MANAGEMENT

The United States Government has acquired certain rights in this invention through government Contract No. DAA B07-87-C-H041 awarded by the Department of the Army.

BACKGROUND OF THE INVENTION

1. Field of the Invention

The invention relates to an aircraft survivability system and more particularly to a method and apparatus to manage the various system states of the aircraft survivability system.

2. Discussion of the Prior Art

In the prior art, individual aircraft survivability equipment (ASE) sensors are used as stand-alone systems. The use of such systems in a stand-alone manner results in high pilot workloads. Further, in such systems only a limited amount of threat data is presented to the pilot. Data provided by various ASE subsystems such as pulse radar jammers, CW radar jammers and missile approach detectors have previously not been used to provide a comprehensive and coherent picture of the threat environment. Thus prior art systems often do not present adequate data in a readily understood format to enable the pilot to quickly and completely assess a given threat environment.

SUMMARY OF THE INVENTION

In contrast to the prior art, the invention, for the first time, integrates all ASE sensors into an integrated ASE system which operates as a finite state machine. In accordance with the principles of this invention data processing, data representation, and initiation of counter measures are state driven. The present invention exhibits several advantages over recent known ASE systems. In one aspect, in contrast to the prior art, the present invention provides a more complete and coherent presentation of inflight threat situations and increases overall system robustness by implementing across-sensor redundancy management.

The present invention further provides an apparatus and method for automatically altering system state based on mission defined variables. Further, the present invention provides a method of initiating counter measures based on correlated threat data and new utility functions such as failure recording and threat data base generation. Accordingly, the present invention reduces pilot workload, increases aircraft survivability, increases mission capability, improves threat situation assessment and improves mission effectiveness.

One principle objective of this invention is to fully integrate all individual ASE subsystems into an integrated ASE system. The integrated system of the invention operates as a state machine. The system controls the power to all of the ASE subsystems, performs Built-In Testing (BIT) and many of the control functions required for an integrated system. At any given time, the integrated ASE system may be placed in a finite state which determines overall threat data presentation capability data processing for active threat data base generation, system fault and other conditions. The invention also provides functional backup for the Radar Warning Receiver and automatic initiation of countermeasures.

The invention provides both automatic and manual control of an aircraft survivability system which can obtain various configurations. The automatic method performs aircraft survivability system configuration sequencing and activating based on the rules defined for mission variables, time, altitude and aircraft position. For the time variable, sequencing rules are applied at or after the time segment has passed. For aircraft altitude, sequencing rules are applied when the aircraft is at or below the target altitude. For aircraft position, sequencing rules apply when the aircraft enters the detection window.

It is one object of the invention to facilitate the task of managing aircraft survivability equipment systems.

It is another object of the invention to reduce pilot work-load.

It is yet another object of the invention to automatically activate designated aircraft survivability equipment configuration.

It is a further object of the invention to provide automatic sequencing of the ASE system to the next segment of the ASE system configuration. It is yet a further object of the invention to allow manual selection of the ASE system configuration Other objects, features and advantages of the present invention will become apparent to those skilled in the art through the description of the preferred embodiment, claims and drawings herein where like numerals refer to like elements.

DETAILED DESCRIPTION OF THE PREFERRED EMBODIMENT

Figure 1:
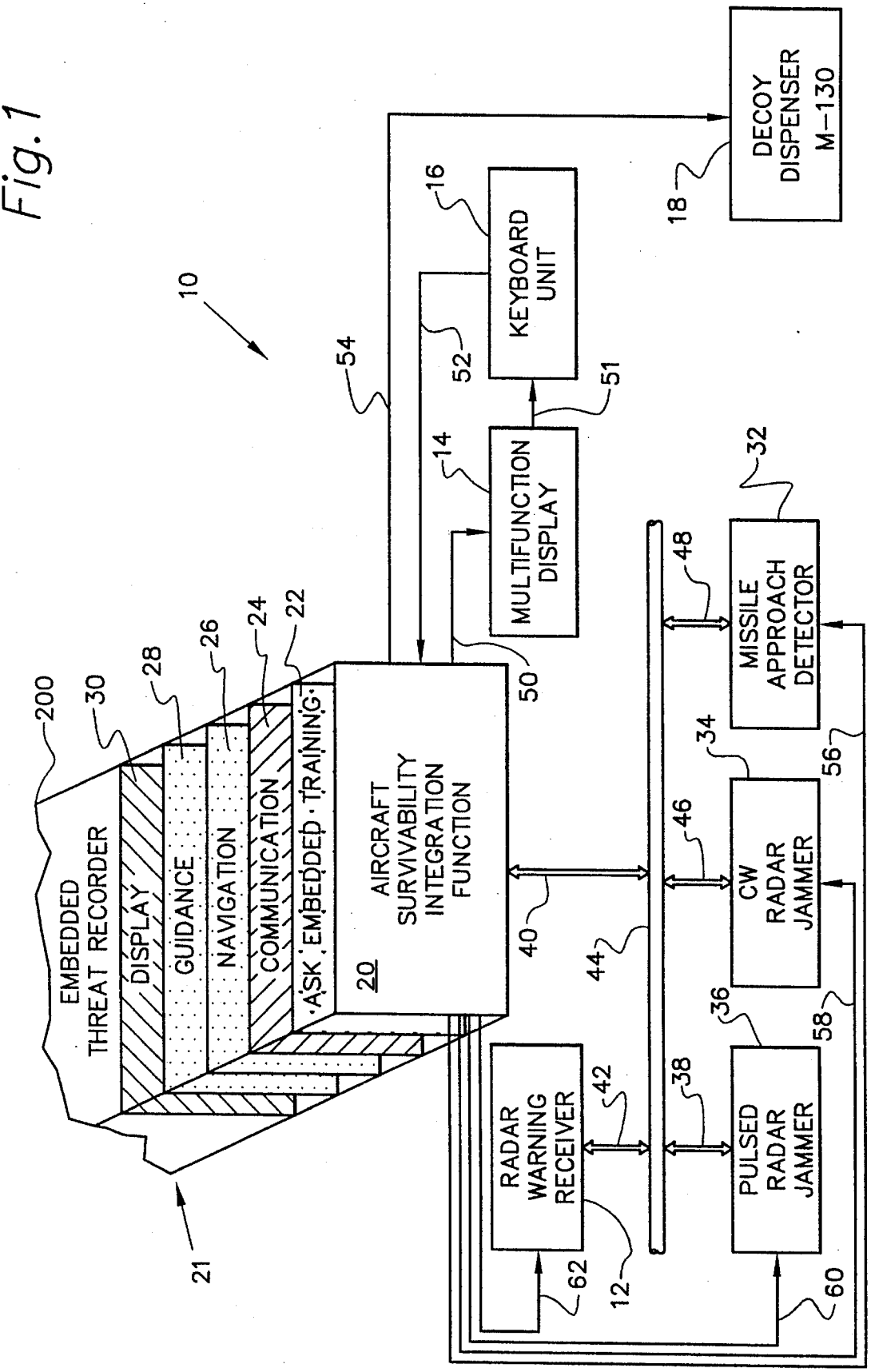
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 20, a multifunction display 14, a keyboard unit 16, a continuous wave (CW) radar jammer 34, a missile approach detector 32, a pulsed radar jammer 36, a radar warning receiver 12 and a decoy dispenser 18. The aircraft survivability integration functions 20 further include aircraft survivability integration functions 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with each other and the aircraft survivability system 21 through a data bus 44. The data bus 44 may advantageously be a NIL standard 1553 data bus or equivalent. In one example of the invention, the radar warning receiver (RWR) 12 communicates with the data bus through communication lines 42, the pulsed radar jammer 36 communicates with the data bus through communication lines 38, and the CW radar jammer 34 communicates to the data bus by communication lines 48. In this way, the sensors in the system which comprise the radar warning receiver 12, pulsed radar jammer 36, CW radar jammer 34 and missile approach detector 32 can receive and transmit data to the aircraft survivability integration system 21. In addition, the aircraft survivability integration system 21 may be hard-wired to the plurality of sensors. This introduction of hard-wired lines to the individual sensors provides a redundancy feature in the system which guards against failure of the data bus 44. For example, the radar warning receiver may be wired by lines 62 into the aircraft survivability integration functions 20, the pulsed radar jammer by lines 60, the CW radar jammer by line 58 and the missile approach detector by lines 56. Hard wire and bus interfaces are typically provided with such ASE devices as are conventionally available.

The multifunction display 14 is controlled by the display apparatus 30 and is wired to the display apparatus 30 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integrated system 21 to the decoy dispenser 18.

Figure 2:
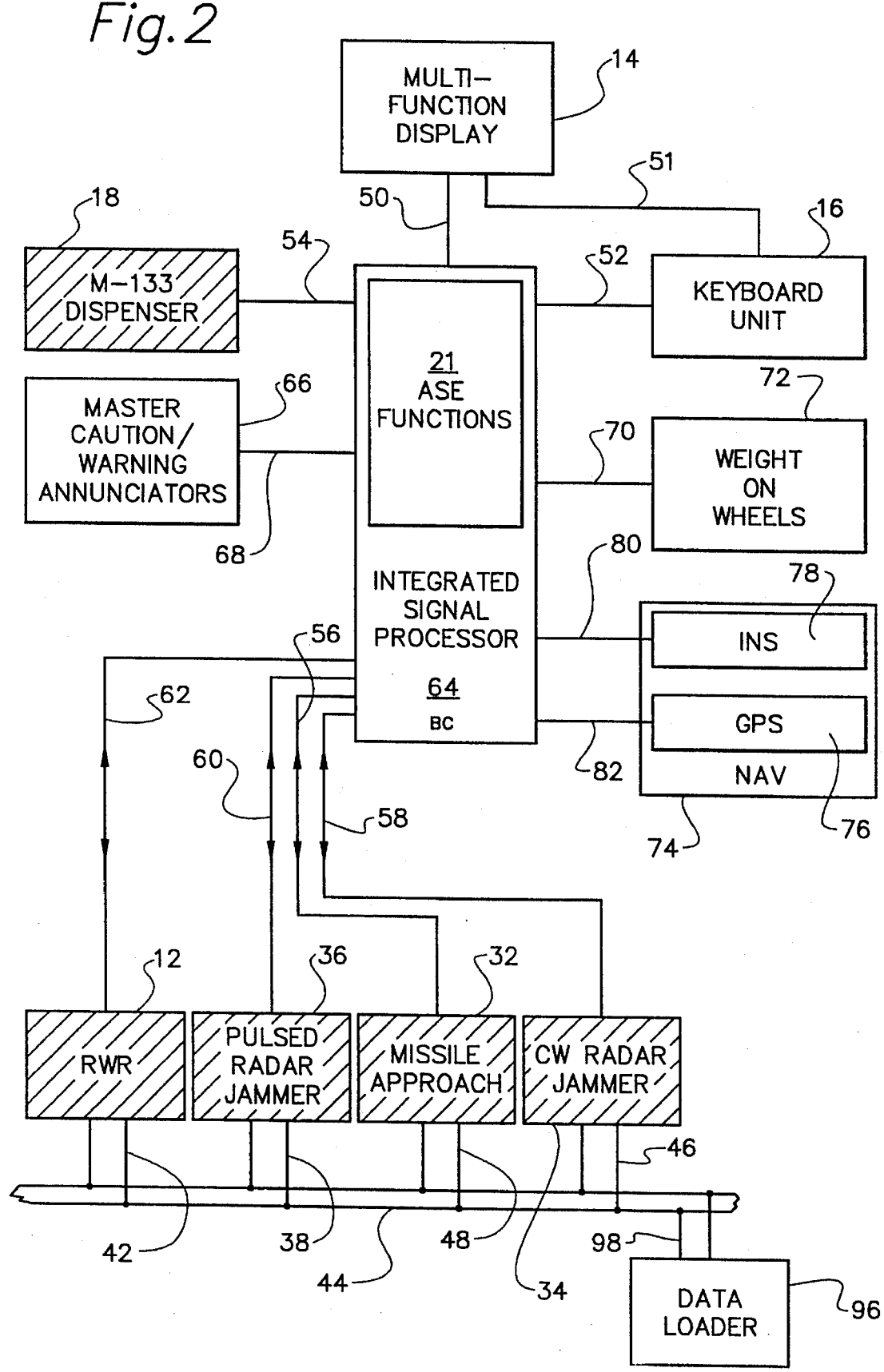
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/avionics control system (ASE/ACS). The aircraft survivability equipment/avionics control system is used to integrate control and display of an ASE suite of devices such as the radar warning detector and jammers as well as selected military communication and navigation systems. Those skilled in the art will understand that the configuration shown in the block diagram of FIG. 2 is one example and does not so limit the invention. In the system shown in FIG. 2, the aircraft survivability integration system 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal line 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration system 21 when appropriate signals are received and correlated from the subsystem sensors, such as missile approach detector and radar warning receiver.

Figure 3:
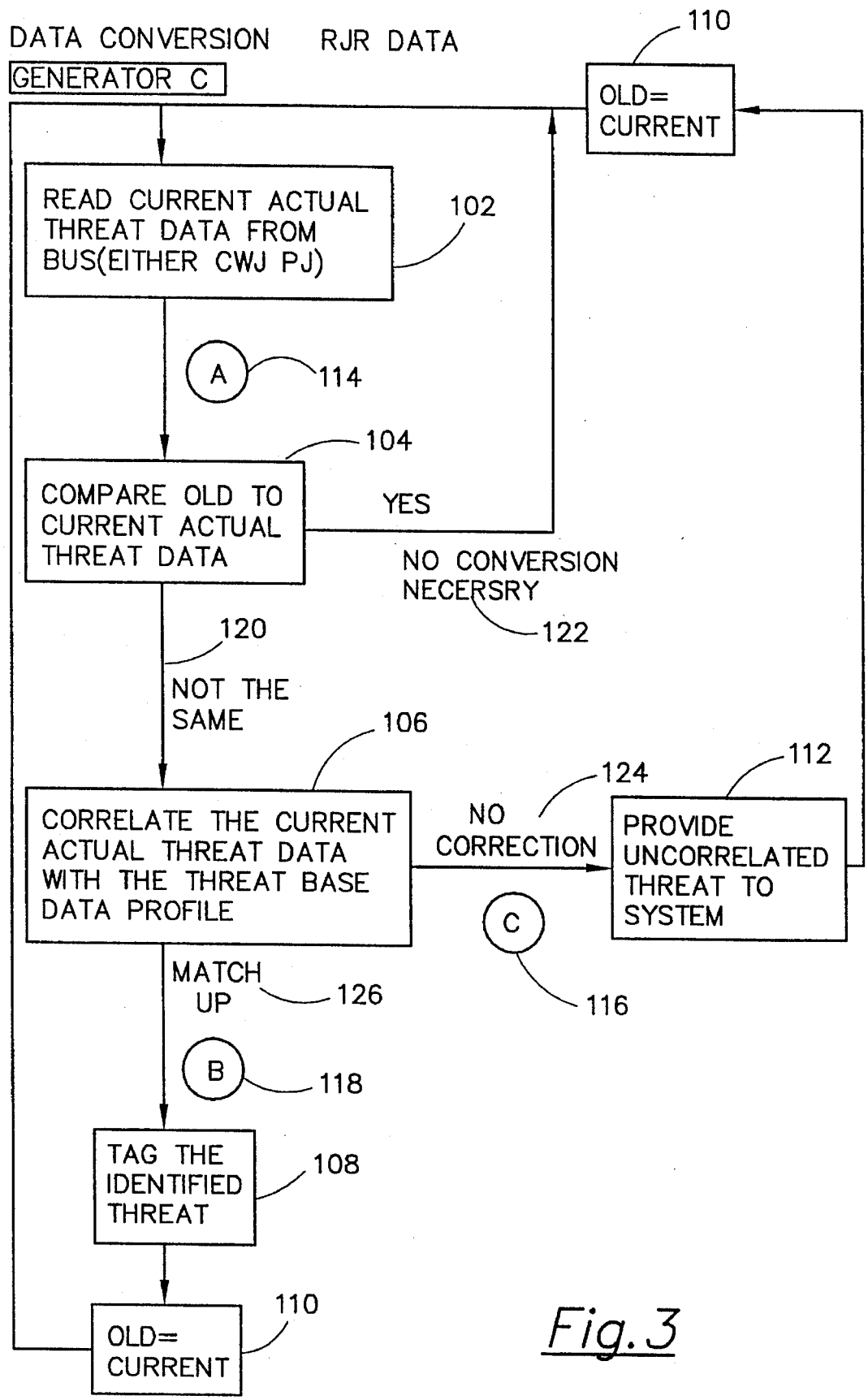
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer or the pulsed radar jammer to either an un-correlated threat or an identified threat. The threat data base is composed of a number of sub-elements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the aircraft. Each threat type has an associated set of parameters which, in one preferred embodiment of the invention, include frequency of the threat signal, amplitude of the threat signal, pulse repetition frequency, pulse repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwire connections line 58 and line 60 and from the radar jammers 34, 36. Those skilled in the art will recognize that the bus method of communication provides more robust threats. The process flows to process step 104 where previously received old threat data is compared to just received current actual threat data. Process step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in process step 104. If the threats correlate and match up as indicated by state 126, the process flows to step 108 where the identified threat is tagged. The process then flows to step 110 to set the old actual threat data to equal the current actual threat data. The process then returns to step 114.

Figure 5:
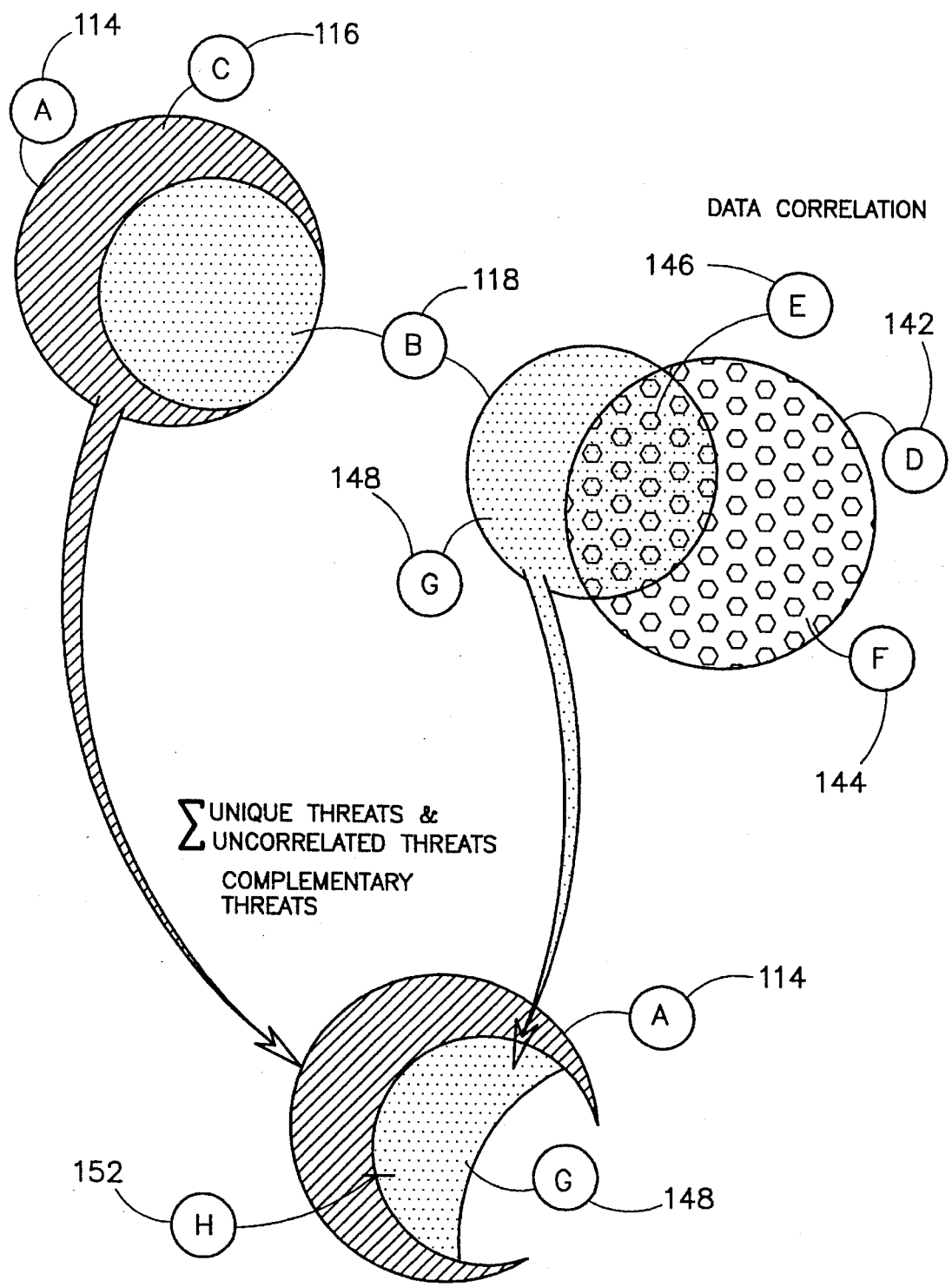
FIG. 5 shows a data flow diagram showing the various data sets of the invention in a Venn diagram fashion.

The processor creates different sets of data which are correlated as shown in FIG. 5 which is described in detail below. At step 102, the process takes data from one of the radar jammers which is designated as data set A 114. In step 106, a data set labeled C 116 is generated which represents an un-correlated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process step 104 the comparison to check old threat data against current threat data results in the old and the current being the same, then the process flows to step 102 to read the next current actual threat data from the bus or from the hardwired system.

Figure 4:
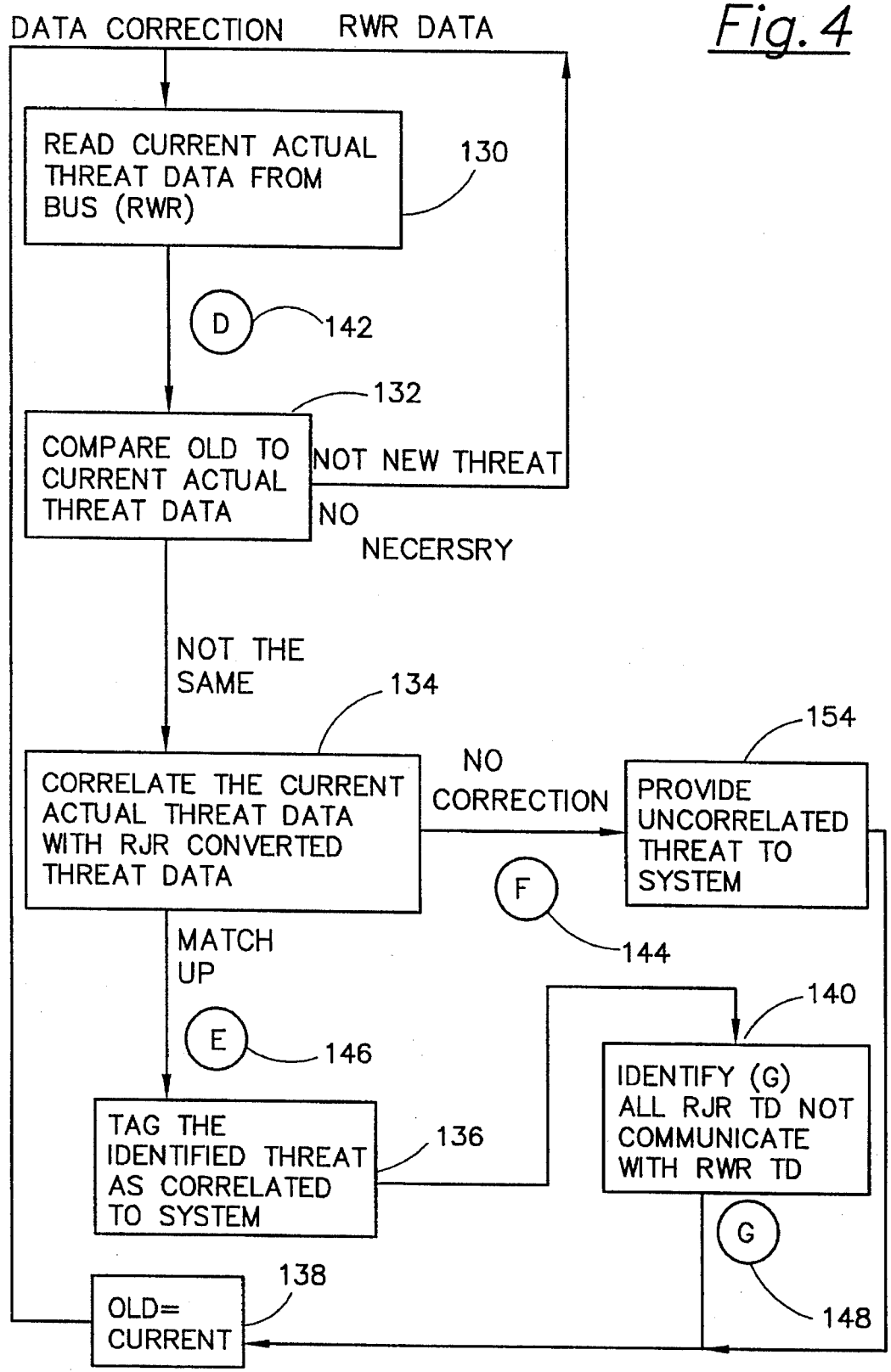
FIG. 4 shows one method of the invention used to perform data correlation on radar warning receiver data.

Referring now to FIG. 4, the method of the invention used to perform data correlation on radar warning receiver data is shown. The process starts at process step 130 where the current actual threat data from the radar warning receiver is read from the data bus. The process step 130 generates data set D 142. Data set D 142 is then used by process step 132 to compare the current actual threat data with old threat data from the radar warning receiver. If the two threats are identical (i.e. the old and the current in step 132), the process returns to process step 130 to read another actual threat. Step 103 reads in all available threats from the radar warning receiver. The set of all possible threats is commonly known as a threat set. In step 132, the old threat set is compared against a current actual threat set data. If the current actual threat set data is not a new threat set, then the process flows to process step 130 to scan another set of threats. In step 132, if there is a new threat, the process flows to step 134 to correlate the current actual threat set with the radar jamming receiver conferred at threat data which is generated in FIG. 3. The threat data is indicated by set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to process step 130 to read the next current actual threat data set from the bus.

If in step 134 there is no correlation between the current actual threat data set with the radar jamming receiver converted threat data set, the process flows to step 154, generates an un-correlated threat set F 144, and provides the un-correlated threat set to the system using the method of the invention.

As is the case with the jammer data, when implementing the method of the invention to convert the current actual threat data set from the radar warning receiver to either a correlated or un-correlated threat, the process creates various other data sets. Data set D 142 is the current active threat data set from the bus. Data set E 146 is the correlated current actual threat data with the radar jamming receiver converted threat data. Data set F 144 is the uncorrelated data. Data set G is the data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 142 is current actual radar warning receiver threat data. Data set E 146 is the common current threat data. Data set F 144 is the un-correlated radar warning receiver threat data. Data set G 148 is the radar jamming receiver threat data which is not common with the radar warning receiver threat data. Data set G is used subsequently to generate a complementary threat set H 152. Data set H 152 is the complimentary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complimentary threat. The data set B 118 is subtracted from data set A 114 to generate data set C 116 which is the un-correlated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H which is called the complementary threat data. The complementary threat data set H comprises threats that are complementary to the already identified threats which have been identified by the radar warning receiver.

Figure 6:
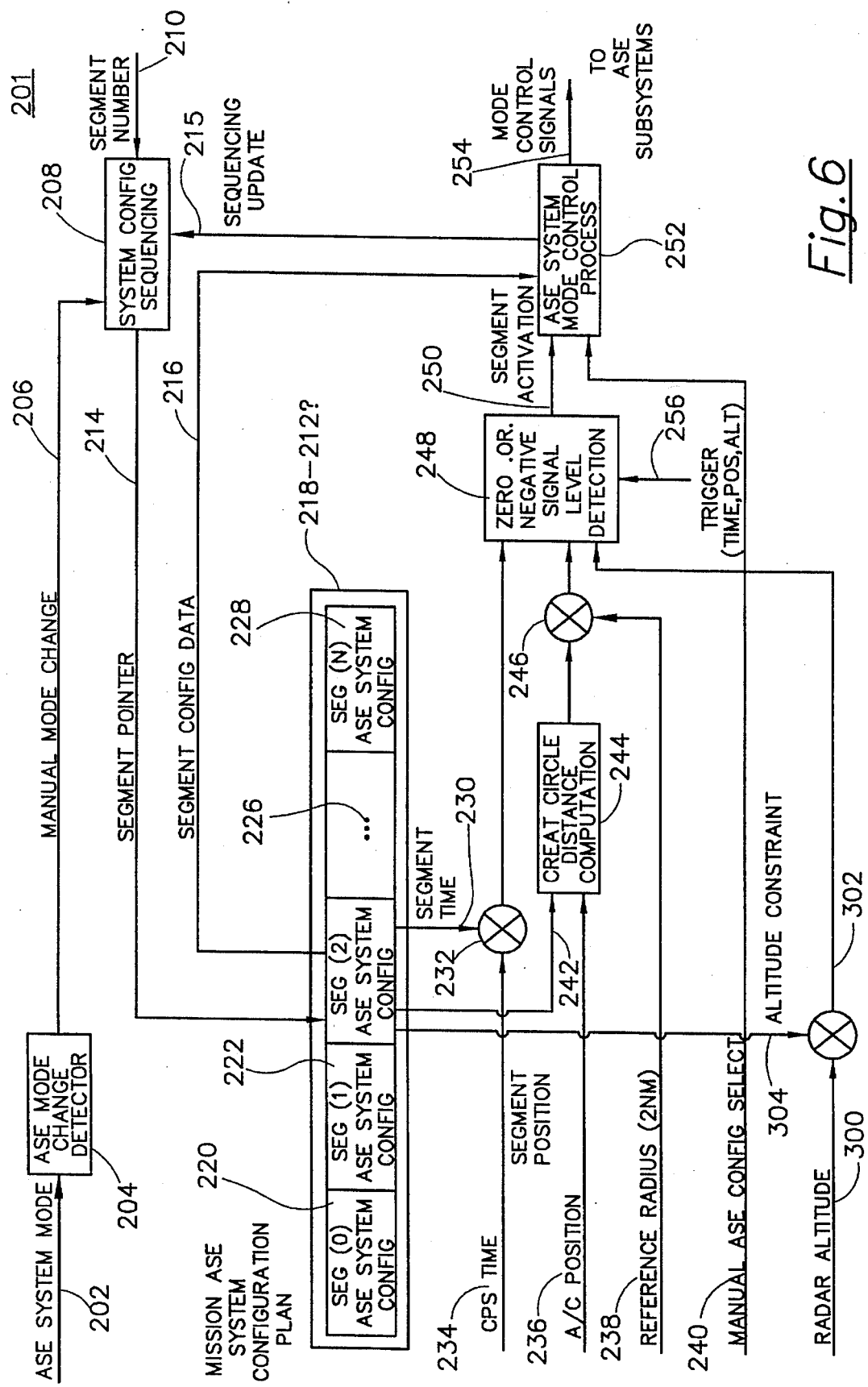
FIG. 6 shows a schematic state diagram showing the aircraft survivability equipment system used to sequence through segments.

Now referring to FIG. 6 which shows an aircraft survivability equipment system in one preferred embodiment of the invention. The aircraft survivability system 201 receives an ASE system mode signal 202 which is connected to a ASE mode change detector 204. The ASE mode change detector 204 outputs a manual mode change signal 206 which is sent to a system configuration sequencing apparatus 208. The system configuration sequencing apparatus 208 receives a segment number signal 210. The system configuration sequencing apparatus 208 also receives a sequencing update signal 215 from an ASE system mode control process 252.

The system configuration sequencing apparatus 208 provides a segment pointer signal 214 to a mission aircraft survivability equipment system configuration plan 218. The configuration plan 218 is composed of at least one aircraft survivability system configuration as shown in FIG. 6. The segment (0) of the ASE system configuration 220 is followed by segment (1) 222 segment (2) 224 intermediate segments ( . . . ) 226 and the last segment or Nth segment (N) 228.

The mission ASE system configuration plan provides a segment position signal 242 and a segment time 230. The segment position signal 242 and the aircraft position signal 236 is used by a great circle computation apparatus 244 to provide a summing junction 246 with a signal that is combined with the reference radius signal 238 to provide a reference position to the zero or negative signal level detection apparatus 248. The zero or negative signal level detection apparatus 248 is also provided with a trigger time and position signal 256. The GPS time 234, which is the real time, is combined with the segment time 230 to provide a second input to the zero or negative signal level detection apparatus 248. The radar altitude 300 is combined with an altitude constraint 304 to provide a differential altitude signal 302 which is provided to the zero or negative signal level detection apparatus 248. The zero or negative signal level detection apparatus 248 provides a segment activation signal 250 to the aircraft survivability equipment system mode control processor 252. The zero or negative level signal detection apparatus 248 provides a means of determining whether or not the three characteristic inertial parameters of time, altitude and position are within the constraints defined by the ASE system configuration. The aircraft survivability equipment system mode control processor 252 is also provided a manual ASE configuration select signal 240. The aircraft survivability equipment system mode control processor 252 provides the system configuration sequencing apparatus 208, a sequencing update signal 215 and provides other aircraft survivability systems with a mode control signal 254.

In one embodiment of the invention the aircraft survivability equipment (ASE) system contains a file called the Mission ASE System Configuration Plan 218. This file contains all the system configurations needed for a mission. Each record in the file is identified as a segment. For example, the segments are designated segment (0) 220, segment (1) 222, segment (2) 224, . . . (n). Each segment contains the following information: time, altitude, aircraft position, and the desired modes for the radar warning receiver, pulse radar jammer, CW radar jammer, and the missile approach detector. Each segment contains the complete information needed for the ASE system. Each ASE system configuration comprises a set of information. The data for the mission ASE system configuration are as follows:

Time=hour: minute: second.

Altitude=feet.

Position=latitude and longitude.

Time, Altitude and Position are mission variables.

Data for the ASE system configuration plan 218 can be entered by two different methods.

a) key entering—data can be set up through the ASE setup page.

b) data down loading—data can be down-loaded from the data transfer cartridge (DTC).

The ASE system powers-up into the default mode which in one preferred embodiment of the invention is the manual mode. In this mode, the pilot can select any one of the defined ASE configuration segments for manual activation through the scratch pad.

Figure 7:
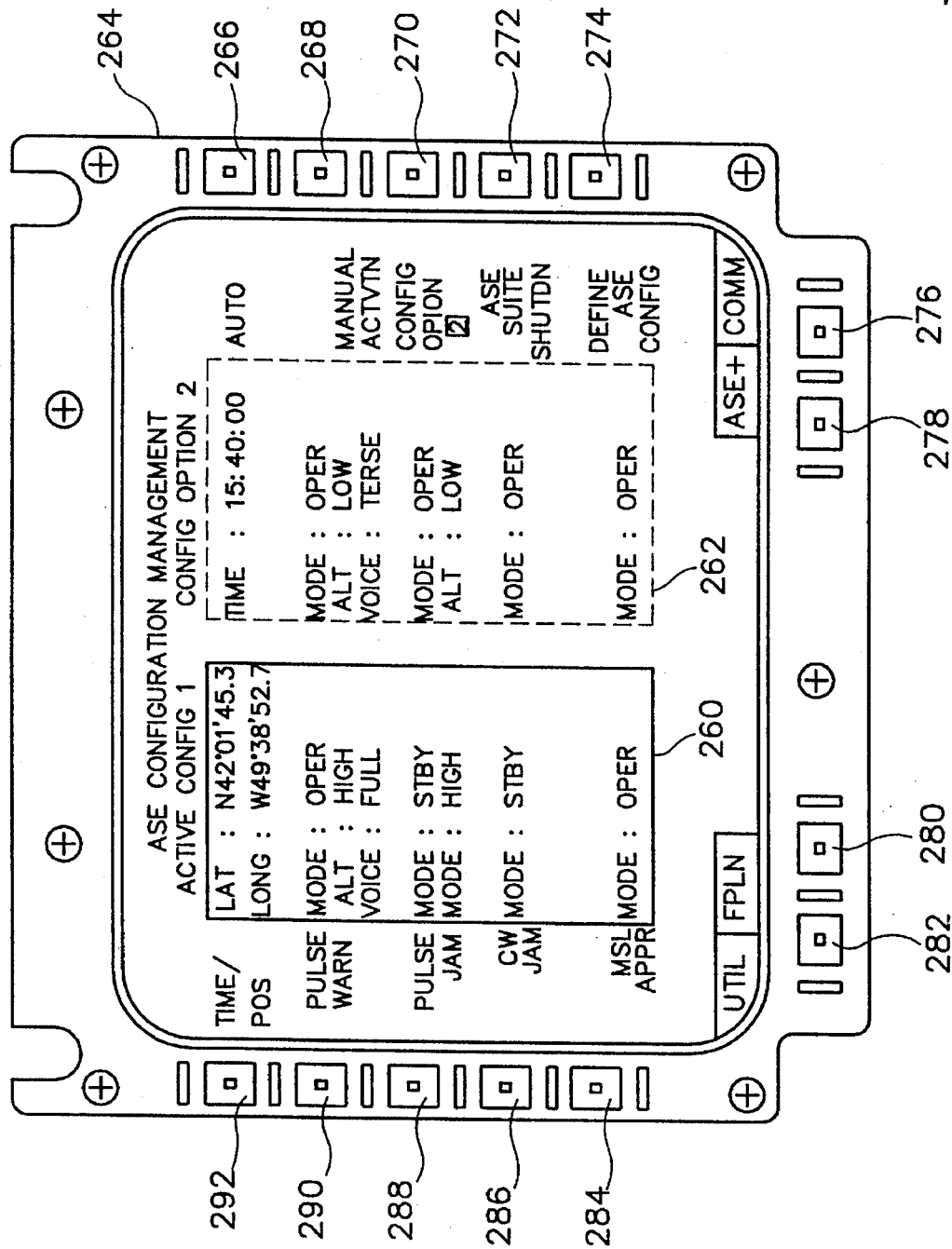
FIG. 7 shows a schematic of an aircraft survivability equipment display showing the active configuration.

Now referring to FIG. 7 which shows a cockpit display for use in an aircraft survivability configuration management display page. FIG. 7 shows the active configuration 260 and the "next" configuration 262.

The active configuration 260 is displayed as a rectangle with a solid borderline. In automode, the dashed rectangle is used to display the "next" ASE system configuration 262 segment.

The sequencing criteria for the automode determines when the "next" segment is activated.

The time defined in the "next" segment is a reference time. It is compared with the current time 234 generated by the GPS. If the current time 234 is equal or greater than the specified time 230, then the next segment is sequenced and becomes the active segment, and the "next-next" segment becomes the "next" segment. The system configuration sequencing apparatus 208 keeps track of the segments and updates the segment pointer signal 214.

Similarly, if the aircraft enters a predetermined region of space called the detection window or if the aircraft descends to or below a target altitude then segment sequencing is performed.

While in automode, if the pilot manually alters any of the system modes, then the automode is de-activated and the manual mode becomes active. The active system configuration 260 is displayed as a rectangle with a solid borderline. In this case, it is up to the pilot to select the next ASE configuration segment and then reselect the automode.

The ASE System Mode Control processor 252 requests the system configuration sequencing processor to update the segment pointer signal 214. At the same time, it begins to process the mode states defined in the segment and generate the proper ASE sub-system mode states.

The great circle distance computation is a simple geodetic equation used in computing the great circle distance between two positions.

The Zero or negative signal level detection apparatus 248 performs a computation that determines if the output signals coming out from the summing junctions 232 and 246 are negative and correspond to the trigger signal (time, altitude, or position). If so, the segment activation signal 250 is set to "high" for a predetermined amount of time, in one preferred embodiment of the invention for 40 ms.

In the Automatic ASE Configuration Mode, switching rules based on time, altitude or location are used to determine when to make the transition from the current ASE configuration segment to another segment. An ASE configuration segment, with time as the mission variable, is switched to when the current time is equal to or passed the time specified in that segment. An ASE configuration segment, with altitude as the mission variables is switched to when the aircraft descends to or below the target altitude. An ASE configuration segment, with position as the mission variable, is switched to when the aircraft approaches within two nautical miles (2 NM) on the location specified in that segment—the detection window. The transition requires this process to set the appropriate mode commands and then send them to the subsystems. If a manual change to a system mode state is made on the ASE page while in the automatic ASE configuration mode, the automatic ASE configuration mode is deselected and the manual mode becomes active. In this instance, the ASE configuration segment zero (0), which contains the current ASE subsystem mode states, is displayed in the left most solidline bordered rectangle.

In the Manual ASE Configuration Mode, a specific ASE configuration segment contained in the ASE configuration plan is activated by entering its index number and then depressing the MANUAL ACTVNT function switch. This causes the process to set appropriate mode commands as defined in the selected segment and transmit them to the applicable subsystems.

System Outputs:
Radar_Warning_Receiver_Mode
Pulse_Radar_Jammer_ Mode
CW_Radar_Jammer_Mode
Missile_Approach_Detector_Mode
M_130_Program_Manual_Mode The Manage ASE System Configuration process provides the aircraft crew with the capability to set up multiple ASE suite configurations prior to flight. The collection of ASE suite configurations can be loaded by manual data entry or automatically. Each plan 218 may contain a predetermined number of different ASE system configurations. Each unique ASE system configuration in the plan 218 is referred to as a configuration segment. Management of the plan can be performed manually by the crew or automatically.

In the manual mode, an ASE configuration segment is activated by entering the segment identification and depressing a line select switch. In the automatic mode, the ASE system configuration management process automatically switches from the current configuration segment to another configuration segment based on mission time, altitude and position.

Inputs:
ASE_System_State
ASE_System_Configuration_Plan
ASE_Configuration_Mode_Select
ASE_Manual_Mode_Change
M_130_Setup_Data
GPS_Current_Time
Mission_Time
GPS_Position
INS_Position
Radar_Altitude This process provides the capability to manually or automatically manage the ASE suite configuration. Mode states and power states of all the ASE subsystems are indicated on the ASE Configuration Management page shown in FIG. 7. The data base containing the system configurations defined for a mission is called the ASE system configuration plan 218.

The procedure to set-up and manage the ASE configuration plan may be carried out by uploading data automatically or by manually entering data. Uploading of the ASE system configuration plan is controlled by a line select switch 266 on the multifunction display 264. The Define ASE Configuration page is provided to manually set-up the ASE system configuration segments of a plan 218.

The ASE Configuration Management Page is accessed from the ASE SETUP page by pressing the L1 line select switch 268. When this page is active, two different ASE configuration segments are displayed within rectangles. Each rectangle contains the following information: the mission variable, the mode setting of ASE subsystem, and the chaff dispensing (i.e. salvo count, salvo interval, burst count, and burst interval). The left most bold-line rectangle contains the current active ASE system configuration while the adjacent dotted-line bordered rectangle contains either an ASE system configuration that has been selected for viewing or the next ASE system configuration in the plan sequence. The five line select switches on the right-hand side of the multifunction display 264 are used to manipulate the ASE system configurations. The R1 line select switch 266 labelled 'AUTO' is used to select the operational mode; the R2 line select switch 268 labelled 'MANUAL ACTVTN' is used to manually activate a particular configuration segment that is selected by entering the index identifier; the R3 line select switch 270 labelled 'CONFIG OPTION' is used to scroll through the ASE system configuration plan; the R4 line select switch 272 labelled 'ASE SUITE SHUTDOWN' is used to power-down the entire ASE suite; and the R5 line select switch 274 labelled 'DEFINE ASE CONFIG' is used to set up the configuration plan.

The Define ASE Configuration Page is accessed from the ASE Configuration Management page and provides all the function keys required to set up an ASE system configuration plan. An ASE configuration plan may have up to twenty different ASE configuration segments. Each segment is comprised of a mission variable and a complete set of subsystem mode states. On the right-hand side of the page, the R1 line select switch 266 is used to set up the operation mode for the Pulse Radar Jammer; the R2 line select switch 268 is used to set up the operational mode for the CW Radar Jammer, the R3 line select switch 270 is used to set-up the operational mode for the Missile Approach Detector; the R4 line select switch 272 is used to set-up the configuration index; and the R5 line select switch 274 is used to access to the ASE Configuration Management page.

On the left-hand side of the page, the L1 and L2 line select switches 292, 290 are used to set-up the operational mode and the voice mode respectively for the Radar Warning Receiver; the L3 line select switch 288 is used to set-up the program/manual mode for the M-130 General Purpose Dispenser; the L4 line select switch 286 is a spare; and the L5 line select switch 284 is used to select and set-up time, altitude and/or position mission variables.

To set up an ASE configured segment, the operator presses the individual function keys (i.e. L1, L2, L3, R1, R2, and F3) to select the desired modes for the ASE subsystems. Once all the modes are selected on the page, the operator can press the NEXT CONFIG function key to advance to the next configuration segment.

The ASE System Configuration process can be placed into a manual configuration mode or an automatic configuration mode. The manual configuration mode is the default mode and the active mode upon system power-up. The automatic configuration mode becomes active when the 'Auto' function key is depressed. Control reverts from the automatic configuration mode back to the manual configuration mode if one of the two following conditions is true: 1) a subsystem mode state is manually changed by the flight crew on the ASE page, or 2) the manual configuration mode has been selected.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished Without departing from the scope of the invention itself.

What is claimed is:

1. An aircraft survivability equipment configuration management display apparatus comprising:
   a. an aircraft display for presentation of an aircraft survivability configuration;
   b. a plurality of actuated buttons coordinated with the aircraft display wherein the aircraft display shows an active configuration list and a next configuration list with at least one configuration parameter;
   c. aircraft survivability system state management means for providing the next configuration to the aircraft display comprising mode change detector means having a system mode input and a manual mode change output, system configuration sequencing means which receives the manual mode change output and has a segment number input, a sequencing update input, and a segment pointer signal output to a means for storing a system configuration plan, said means for storing a configuration plan stores multiple configuration plans which are sequenced through by receipt of the segment pointer signal, the means for storing system configuration plans provides a segment configuration data output and a segment timer output and a segment altitude output and a segment position output, the segment timer output is transmitted to a time comparison means for comparing a current time to the segment timer output having a time signal output, while the segment altitude output is transmitted to a altitude comparison means for comparing radar altitude to the segment altitude output, said altitude comparison means having an altitude signal output, a great circle distance computation means receives the segment position output as well as an actual aircraft position signal, said great circle distance computation means outputs a proximity signal which is compared to a reference radius to generate a position reference output which is transmitted to a zero or negative signal level detection apparatus along with the time signal output, the altitude signal output and a trigger input, said zero or negative signal level detection apparatus generates a segment activation output which is received by a system mode control processing means, said system mode control processing means also receives an ASE configuration select as well as the segment configuration data signal and outputs a mode control signal as well as a sequencing update signal to the system configuration sequencing means.

2. The aircraft survivability equipment configuration management display apparatus of claim 1 wherein the configuration lists comprises a latitude, a longitude, radar warning receiver information, pulse radar jammer information, continuous wave jammer information, and missile approach detector information.

* * * * *